United States Patent [19]

Conti

[11] 4,326,605
[45] Apr. 27, 1982

[54] LUBRICATING COLLAR FOR CABLE

[76] Inventor: Armand R. Conti, 3464 N. Wendover Cir., Youngstown, Ohio 44511

[21] Appl. No.: 95,890

[22] Filed: Nov. 19, 1979

[51] Int. Cl.³ .................................................. 118 405
[52] U.S. Cl. .............................................. 184/15 R
[58] Field of Search ............... F16N/7/24; 184/15 R, 184/15 A; 118/125, 307, 325, 405, DIG. 18

[56] References Cited

U.S. PATENT DOCUMENTS

| | | | |
|---|---|---|---|
| Re. 29,493 | 12/1977 | Crump | 184/15 R |
| 296,645 | 4/1884 | Stubbe | 118/405 X |
| 607,332 | 7/1898 | Bertrand | 118/405 |
| 1,471,583 | 10/1923 | Andersen | 184/15 R |
| 1,943,818 | 1/1934 | Fantone et al. | 118/125 |
| 2,140,426 | 12/1938 | Hodson | 184/15 R |
| 2,287,825 | 6/1942 | Postlewaite | 118/405 X |
| 2,665,773 | 1/1954 | Osmun | 184/15 R |
| 3,783,972 | 1/1974 | Molstad | 184/15 R |
| 4,063,617 | 12/1977 | Shenk | 184/15 R |

FOREIGN PATENT DOCUMENTS

| | | | |
|---|---|---|---|
| 2142928 | 8/1973 | Fed. Rep. of Germany | 184/15 R |
| 530586 | 10/1921 | France | 184/15R |

*Primary Examiner*—David H. Brown
*Attorney, Agent, or Firm*—Thomas H. Murray; Clifford A. Poff

[57] ABSTRACT

A lubricating collar for cable includes a truncated conically-shaped funnel section forming an entry guide terminating in an annular collar section that forms a lubricant discharge station which is openly exposed to the cable entry end of the collar. An internal chamber in the collar section supplies lubricant to orifices in the side wall thereof. Downstream of the lubricant discharge station there is a brush with a multitude of elongated fibrous bristles projecting radially from the side wall of the collar into the internal passageway of the collar to contact and spread lubricant on the outer surface of the cable when moved within the collar to a discharge guide section.

7 Claims, 3 Drawing Figures

U.S. Patent  Apr. 27, 1982  4,326,605
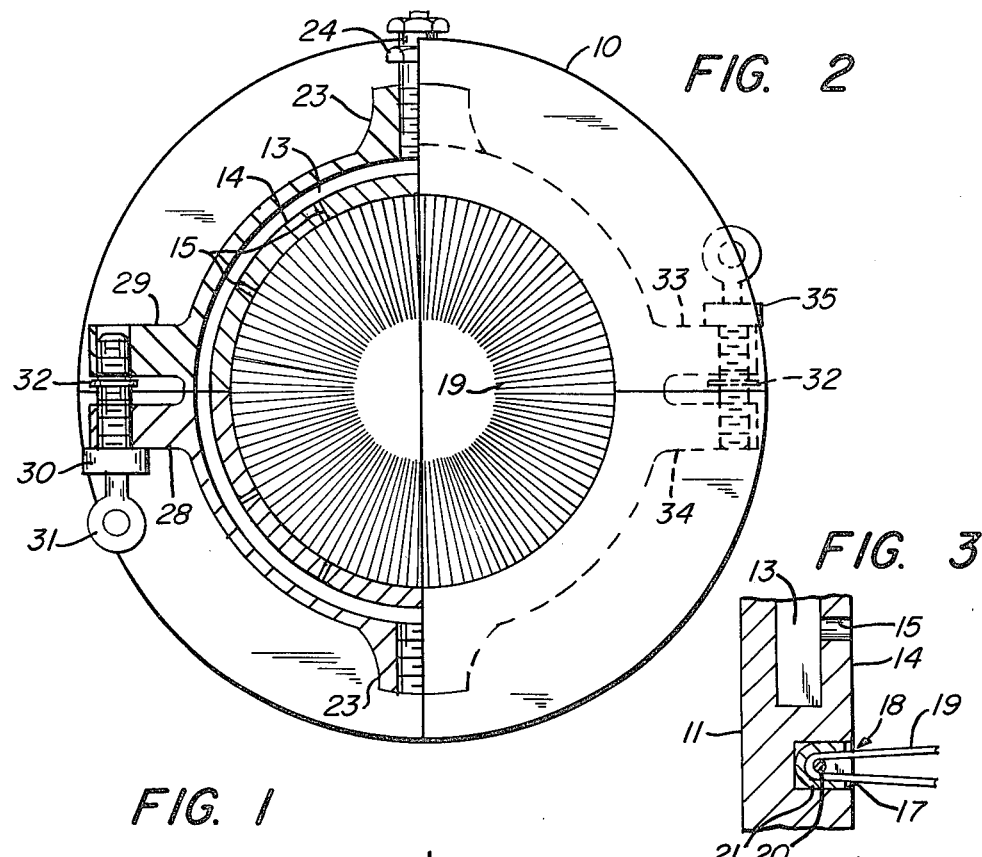
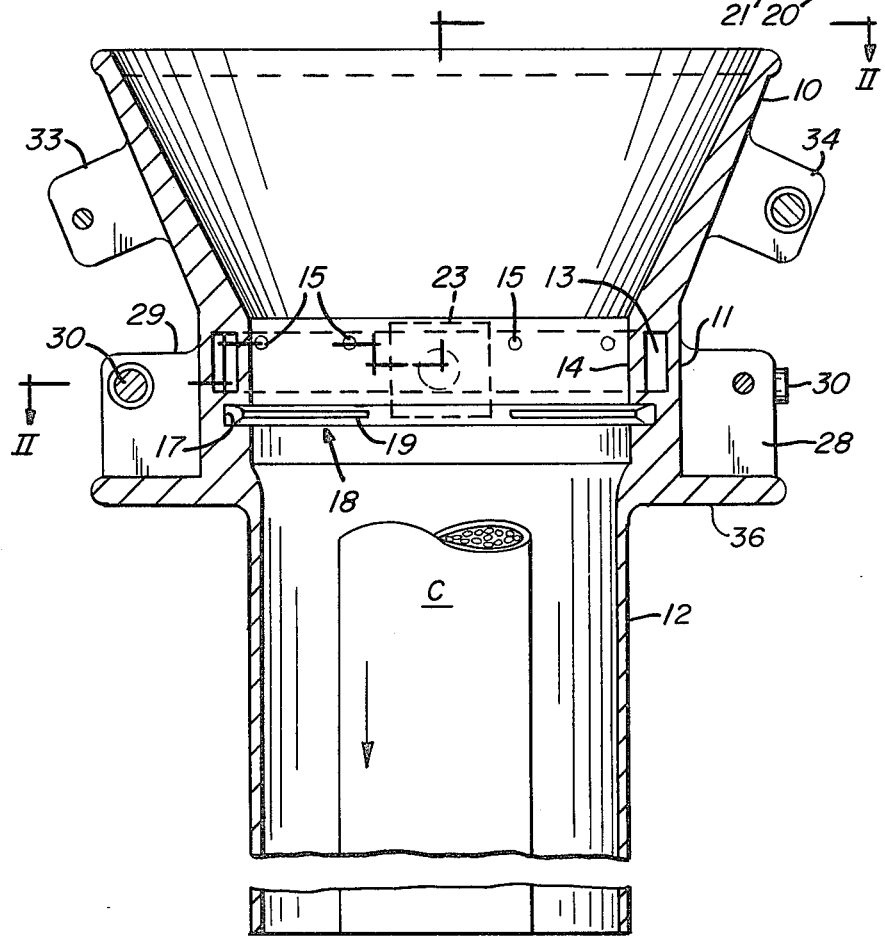

LUBRICATING COLLAR FOR CABLE

BACKGROUND OF THE INVENTION

This invention relates to a lubricating collar for applying lubricant to the outer surface of a cable preparatory to pulling the cable into a conduit. More particularly, the present invention relates to such a collar having lubricant discharge orifices at a lubricating station which is openly exposed to the cable entry end of the collar and immediately followed by a brush having elongated fibrous bristles projecting radially into the internal passageway of the collar to spread lubricant on the outer surface of the cable.

In the placement of underground cables, particularly telephone communication cable and electric utility cable, procedures are necessary to protect the cable from damage during the placement operation. A flexible feeder tube having a weakened longitudinal area in the side wall thereof is now available for protection and guidance of a cable while fed from a supply reel to an underground circuit. The feeder tube can be stripped from the cable laterally by severing the tube along a weakened side wall section to meet the need for placing cable having connectors attached to the conductors which are part of the cable during the placement operation. A lubricating collar is attached to the end of the feeder tube to apply lubricant onto the surface of the cable before entry into the feeder tube. The collar is split longitudinally and provided with fastening means for releasably joining together the halves of the split collar. The fasteners are used to release the individual halves of the collar for lateral removal from their normally-surrounding relation with the cable. The collar is made up of a funnel-shaped entry section; a downstream lubricating section; and a succeeding tubular end part dimensioned to fit within the flexible feeder tube. Rubber discs with radial slots extend from a central opening to form wipers for distributing luricant on the cable. One wiper is positioned between the funnel-shaped entry section and the lubricating section and another wiper is positioned between the lubricating section and the tubular end part. The various parts of the collar are held together by bolts in tension extending along the outer side wall of the collar. Another form of lubricating collar is shown in U.S. Pat. No. 4,028,473. The collar in this patent is not split and includes three disc-shaped wipers arranged at spaced-apart locations within the collar which is also an assembly of parts held together by bolts in tension. One wiper encloses the entry side of a lubricating section and two spaced-apart wipers are situated at the discharge side of the lubricating section.

U.S. Pat. Nos. 4,046,225 and 4,063,617 disclose flexible discs in a lubricating collar assembly at opposite sides of a lubricant-filled chamber. The flexible rubber discs shown in these patents are used to seal the lubricant chamber area to the cable and spread the lubricant about the surface of the cable upon withdrawal from the lubricant-filled chamber.

I have discovered that the flexible rubber discs at the entry side of the lubricant-filled chamber, such as disclosed in the aforesaid patents and application, are detrimental to controlling the discharge of lubricant into the collar. Moreover, use of such a disc in the past required a collar construction made up of a number of parts that must be bolted together in a liquid-tight manner to avoid a loss of lubricant from the collar. The cable invariably moves from its desired central location in the aperture of the wiper. This strips more lubricant from one side of the cable than the diametrically-opposite side of the cable but more importantly, may damage the wiper. The flexibility of the wipers and, hence, also their required sealing relation in the collar assembly, are subject to the environmental temperature as well as deterioration, including attack by solvents or other chemicals that contact the wipers at one time or another. These disadvantages as well as others are overcome by the lubricating collar of the present invention.

SUMMARY OF THE INVENTION

It is an object of the present invention to provide an improved apparatus for applying lubricant to the outer surface of cable incident to passage of the cable into a duct or the like wherein the apparatus embodies an improved spreader for lubricant on the outer surface of the cable after discharge of the lubricant onto the cable at an immediately preceding discharge station which is openly exposed to the cable entry end of the apparatus.

It is further object of the present invention to provide an improved spreader and relationship of parts in an apparatus for applying the lubricant to the outer surface of a cable which overcomes the disadvantages and shortcomings of known cable lubricators as described hereinbefore.

According to the present invention, there is provided apparatus for applying lubricant to the outer surface of a cable for passsage into a duct wherein the apparatus includes an open-ended collar having a tubularly-shaped side wall forming an internal passage surrounding a length of cable when positioned within the collar, the side wall having orifices to discharge lubricant into the internal passageway at a lubricant discharge station which is openly exposed to the cable entry end and spaced from the cable discharge end of the collar, the side wall further having a recess transverse to the cable passageway in the collar and located between the lubricant discharge station and the discharge end of the collar, a spreader including a holder supporting spreader means to project radially from the side wall of the collar while supported in the recess to extend into the internal passageway to contact and spread lubricant on the outer surface of the cable when moved beyond the lubricant discharge station, and means for supplying lubricant to the orifices.

In the preferred aspect of the present invention, the aforesaid collar is subdivided into two halves which are joined together by fasteners so that the collar can be removed laterally from a cable when necessary or desired. It is preferred that the collar is made up of two unitary halves, each of which is an integral casting. Each collar half includes an internal reservoir for supplying lubricant to the orifice in a wall section surrounding the internal passageway in the collar at the lubricant discharge station. The spreader preferably takes the form of a channel receiving and supporting a multitude of elongated fibrous bristles.

These features and advantages of the present invention as well as other will be more fully understood when the following description is read in light of the accompanying drawings, in which:

FIG. 1 is an elevational view of one of two mating halves of a lubricating collar according to the preferred embodiment of the present invention.

FIG. 2 is a sectional view taken along line II—II of FIG. 1; and

FIG. 3 is an enlarged partial view of the brush and lubricant discharge nozzles employed in the lubricating collar shown in FIGS. 1 and 2.

The lubricating collar shown in FIGS. 1 and 2 is made, according to the preferred embodiment of the present invention, in two halves each including a unitary casting. The collar halves are releasably joined together by fasteners; however, it is within the scope of the present invention to construct the lubricating collar as a unitary member, thus eliminating the need for such fasteners. FIG. 1 illustrates part of a typical cable C in the collar and an arrow indicates the direction of cable movement. The lubricating collar includes a truncated conically-shaped funnel section 10 that forms an entry guide for cable passing into the collar. Commencing at the termination plane of the funnel section 10 is an annular collar section 11 that terminates at a discharge guide section 12 having a relatively thin annular wall as compared with, for example, the annular wall in collar section 11 and the wall of funnel section 10. An annular chamber 13 is defined within the wall of the collar section 11 by a core used in the mold during casting of the collar. The chamber 13 forms an internal reservoir for lubricant which is separated from the internal passageway in the collar by wall section 14. Orifices 15, typically in the form of drilled holes in wall section 14, are spaced about the periphery of the collar section. The orifices are equally spaced in the preferred aspect of the invention to discharge lubricant from points around the circular interior of the collar which facilitates a circumferential supply of lubricant to the surface of the cable.

A transverse plane through the collar intersecting the orifices 15 thus defines a lubricant discharge station; however, it is to be understood that the orifice openings may be arranged in any desired pattern for communication with the internal passageway formed by chamber 13. Thus, given a desired height of the chamber 13 in respect to the direction of movement of the cable through the collar, the orifices 15 may be located for communication with the chamber at different heights about the periphery of the wall section 14. The lubricant discharge station is defined in relation to the movement of the cable through the collar by the length of the wall section 14. Downstream of wall section 14, but a closely-spaced relation therefrom, is a circumferential recess 17 in the annular collar section 11. As best shown in FIGS. 1 and 3, the recess is dimensioned and arranged to receive a spreader in the form of brush 18 for support by the collar. The brush 18 includes a multitude of elongated fibrous bristles 19 projecting radially from the side wall of the collar into the internal passageway to contact and spread lubricant on the outer surface of the cable. The bristles 19 are typically made of plastic material. A retainer 20 supports the bristles within a channel 21. The channel is crimped to the bristles about the major part of retainer 20 to provide a brush assembly. The channel 21 is dimensioned for nested seating within the recess 17.

As best shown in FIG. 2, the bristles 19 extend toward the central axis of the collar but terminate short thereof to form a circular opening which is typically smaller than the diameter of the cable so that excessive amounts of lubricant are removed and redistributed about the surface of the cable. An important feature of the present invention is the use of a single brush at a location which is downstream, in relation to the direction of movement of the cable through the collar, of the lubricant discharge station. If desired, a spreader in the form of a flat rubber disc with a central opening extended by radial slots can be supported by channel 21 in recess 17. By this construction and relationship of parts, the lubricant discharge station is openly exposed to the cable entry end of the collar. The truncated conically-shaped funnel section 10 provides adequate containment of the lubricant when discharged onto the cable in the collar. Necessary adjustments for controlling the flow of lubricant are greatly enhanced by the ability to visually observe and monitor the discharge of lubricant. While the collar is usually employed to lubricate cable while moving in a generally-vertical direction, it can be used with equal success to lubricate cable while moving at any angle to the vertical even including horizontal movement of the cable.

FIGS. 1 and 2 illustrate a cast projection 23 extending from the other surface of the annular collar section 11 external to the internal passageway through the collar. This cast projection has a threaded opening extending into communication with the chamber 13. The threaded opening receives the threaded end of a fitting 24 coupled to a conduit extending to a suitable pressurized supply of lubricant. While any of the various known forms of lubricant can be supplied to the collar of the present invention, it is preferred to employ the lubricant disclosed in U.S. Pat. No. 4,111,820. Of the various lubricant compositions disclosed in this patent, it is preferred to employ a lubricant consisting essentially of 3 parts by volume propylene glycol, 1 part by volume polyethylene oxide and 9–40 parts, but usually 25 parts by volume, water. Such a lubricant is nondegrading to plastic materials and, therefore, is especially useful in cable replacement operations where the cable sheathing is made of polyethylene material. Both halves of the collar may be provided with a projection 23 and coupled to a lubricant supply, when desired. Thus, two projections 23 are shown, one for each of the divided halves of the collar. A plug can be used to prevent escape of lubricant from one of the projections 23 when it is not used.

As shown in FIGS. 1 and 2, projecting from the outer surface of the truncated conically-shaped funnel section 10 adjacent the parting line between mating halves of the collar are pairs of lugs 28 and 29. One lug 28 of each pair includes a bored opening to support the shank portion of a threaded fastener 30 having an eyelet opening at end 31. The eyelet opening is usefully employed for attachment to support rigging to maintain the collar at a desired position during the cable drawing operation. A retainer 32 is passed onto a threaded end of the fastener 30 for retainment by lug 28. The projecting end of the fastener is threadedly received into a tapped hole formed in lug 29. A similar arrangement of parts is provided on the outer surface of annular collar section 11. Extending from this wall section are pairs of lugs 33 and 34 which are releasably joined together by a threaded fastener 35 in the same manner as already described in regard to threaded fastener 30. Also projecting from the outer surface of the collar is a thin web section 36 for added support for the lugs 33 and 34 and for strengthening the collar at the transition zone between the annular collar section 11 and the discharge guide section 12.

Although the invention has been shown in connection with a certain specific embodiment, it will be readily apparent to those skilled in the art that various changes in form and arrangement of parts may be made to suit requirements without departing from the spirit and scope of the invention.

I claim as my invention:

1. Apparatus for applying lubricant to the outer surface of a cable for passage into a duct, said apparatus comprising an open-ended collar including a truncated, conically-shaped funnel section forming a cable entry guide joined integrally with an elongated and tubularly-shaped side wall forming an internal passageway with said funnel section to surround a length of a cable when positioned within the collar, said side wall having orifices to discharge lubricant into the internal passageway at a lubricant discharge station openly exposed by said cable entry guide and spaced from a cable discharge end of the collar, said cable entry guide being openly exposed to the lubricant discharge station to visually observe and monitor the discharge of lubricant onto a cable and to provide containment of the lubricant, said side wall further having a recess transverse to the internal passageway in the collar adjacent said lubricant discharge station and essentially between said lubricant discharge station and the cable discharge end of the collar, a spreader positioned in said recess for support by the side wall of the collar, said spreader including a holder supporting spreader means to project radially from the side wall of the collar into the internal passageway to contact and spread lubricant on the outer surface of the cable, and means for supplying lubricant to said orifices.

2. The apparatus according to claim 1 wherein said spreader means include a multitude of elongated fibrous bristles.

3. The apparatus according to claim 1 wherein said holder includes a support channel receiving said spreader means for support within the recess in the side wall of the collar.

4. The apparatus according to claim 1 wherein said open-ended collar is subdivided into collar halves along a longitudinal plane parallel with the internal passageway, said apparatus further comprising means for releasably adjoining the halves of the collar together.

5. The apparatus according to claim 1 or 4 wherein said means for supplying lubricant includes an internal reservoir in the side wall of said collar having a wall section surrounding the internal passageway at said lubricant discharge station, said wall section having a plurality of openings spaced from one another about the wall section for defining said orifices.

6. The apparatus according to claim 4 wherein said means for releasably adjoining includes threaded fasteners, and wherein said collar includes pairs of support ribs projecting from the outer surface thereof, one rib of each pair supporting a fastener for releasably engaging the other rib of each pair.

7. The apparatus according to claim 4 wherein said holder includes two support channels to receive said spreader means for support within the recess in the side wall of the collar, each channel having an arcuate length substantially corresponding to an arcuate length of the recess in one of said collar halves.

* * * * *